United States Patent [19]
Lemker et al.

[11] 4,213,772
[45] Jul. 22, 1980

[54] PROCESS FOR PRODUCING A GRADIENT PHOTOCHROMIC OPHTHALMIC LENS

[75] Inventors: Richard S. Lemker; Clyde H. Storey, both of Harrodsburg, Ky.

[73] Assignee: Corning Glass Works, Corning, N.Y.

[21] Appl. No.: 674,897

[22] Filed: Apr. 8, 1976

[51] Int. Cl.² .................. C03B 32/00; C03C 23/00
[52] U.S. Cl. .................................. 65/30 R; 65/DIG. 2
[58] Field of Search .......... 428/164; 65/107, DIG. 2, 65/30 R

[56] References Cited

U.S. PATENT DOCUMENTS

| | | | |
|---|---|---|---|
| 2,825,634 | 3/1958 | Rindone | 65/DIG. 2 |
| 2,984,943 | 5/1961 | White | 65/107 |
| 3,300,670 | 1/1967 | Veres | 65/DIG. 2 |

FOREIGN PATENT DOCUMENTS 739404  7/1966  Canada .................................. 65/30 R

*Primary Examiner*—Richard V. Fisher
*Attorney, Agent, or Firm*—Kees van der Sterre; Clinton S. Janes, Jr.

[57] ABSTRACT

A photochromic ophthalmic lens exhibiting a gradient photochromic effect is produced in accordance with a heat treating process wherein the development of photochromic properties in a selected limited portion of the lens is suppressed by the action of vapor produced utilizing a porous refractory carrier material containing an evaporable liquid.

5 Claims, 2 Drawing Figures

PROCESS FOR PRODUCING A GRADIENT PHOTOCHROMIC OPHTHALMIC LENS

BACKGROUND OF THE INVENTION

Glass articles exhibiting a gradient photochromic effect are well known. Canadian Pat. No. 739,404, for example, describes a method for producing a glass plate having a photochromic portion and a non-photochromic portion which comprises forming a glass plate from a glass composition which can be rendered photochromic by a suitable heat treatment, and thereafter subjecting the glass plate to a heat treatment in a partitioned lehr. Alternatively, the heat treatment may be carried out while the glass is partly encased in a refractory block.

The partitioned lehr and the refractory block both function to produce a temperature gradient across the glass. This gradient is such that one portion of the glass reaches a temperature sufficient to develop good photochromic properties while the other portion does not. The portion of the glass which has not been exposed to the higher temperatures may be either non-photochromic or photochromic to a lesser extent than the fully treated glass. In either case, the glass is referred to as a gradient photochromic glass.

German Patentschrift No. 2,125,232 suggests a related method for producing gradient photochromic glass wherein continuous sheet composed of potentially photochromic glass is drawn past a heating source which is directed only to a selected edge portion of the sheet. The heated edge portion then develops the desired photochromic properties, whereas the unheated regions do not.

Neither of the above methods is compatible with current methods for the production of photochromic ophthalmic lens blanks, so as to permit the efficient manufacture of gradient photochromic ophthalmic lenses. The method of the German patent is suitable only for a continuous sheet drawing process. The concept of the partitioned lehr disclosed in the Canadian patent cannot be economically adapted to presently used photochromic glass heat treating lehrs which are designed to handle many lens blanks simultaneously on a continuous basis. Similarly, the use of refractory shielding blocks into which glass must be packed with fibrous insulation is not practical where large numbers of glass articles must be handled.

An alternate method for producing a gradient photochromic glass article is disclosed in U.S. Pat. No. 3,419,370. That patent describes a process for producing a silver halide photochromic glass by the ion exchange treatment of a halogen-containing glass in a silver salt bath. It is noted in that patent that a gradient in photochromic behavior across a glass body can be attained by varying the time and/or temperature at which different portions of the glass body are exposed to the silver ion exchange medium.

Ion exchange processes for producing graded photochromic properties are also unsuited for the commercial production of gradient photochromic ophthalmic lenses. The use of silver ion exchange media such as molten salt baths is complex and expensive. Also, ion exchange processes must be carried out on a batch-by-batch basis, and thus are not readily adaptable to the continuous high-volume production of ophthalmic lenses.

It is the principal object of the present invention to provide methods and apparatus for producing gradient photochromic ophthalmic lenses which are both simple and inexpensive.

It is a further object of the invention to provide methods and apparatus for producing gradient photochromic ophthalmic lenses which are fully compatible with heat treating processes and equipment presently used for the production of photochromic ophthalmic ware.

Other objects and advantages of the invention will become apparent from the following detailed description thereof.

SUMMARY OF THE INVENTION

In accordance with the present invention we have found that we can suppress the development of photochromic properties in a selected limited portion of the lens, which portion is to exhibit non-photochromic or reduced photochromic properties in use, by generating a cooling vapor in the vicinity of that portion of the lens while the lens is being heat treated to develop photochromic properties. This cooling vapor can prevent or control the growth of silver halide crystals in the glass.

The vapor technique is particularly advantageous because it can be carried out using present heat treating lehrs and heating schedules. Thus the heat treating of the lens is accomplished in a conventional lehr or furnace operating at ordinary temperatures.

Briefly, our process comprises exposing an ophthalmic lens blank composed of a potentially photochromic glass to a source of heat which is sufficient to fully develop photochromic properties in the potentially photochromic glass. However, during this exposure, a quantity of an evaporable liquid contained in or supported by a porous refractory carrier material is positioned in proximity to a selected limited portion of the lens wherein the development of photochromic properties is to be suppressed. The evaporable liquid and refractory ceramic carrier material act during the heat treatment as a controlled source of cooling vapor. This vapor maintains the selected limited portion of the lens at a lower temperature than the remaining portion of the lens during the period of exposure to high temperatures. Thus, although the remaining portion of the lens reaches a temperature sufficient to achieve full photochromic development, the development of photochromic properties in the selected lens portion is suppressed and a gradient ophthalmic lens is provided.

The invention further includes apparatus for maintaining a temperature gradient across an ophthalmic lens during heat treatment, which apparatus utilizes the principle of vapor cooling to provide a gradient photochromic opthalmic lens. The apparatus comprises lens support means for supporting a potentially photochromic opthalmic lens blank in a horizontal position in a glass heat treating furnace during heat treatment. Included within the lens support means are carrier support means for supporting a quantity of a porous refractory carrier material impregnated with an evaporable liquid. The carrier support means are positioned so that the impregnated carrier is in proximity to a selected limited portion of an ophthalmic lens which is provided in the horizontal position therefor on the lens support. During heat treatment of the lens, vapor released from the impregnated carrier cools the selected limited portion of the lens which is in proximity thereto, and maintains that portion at a lower temperature than the remainder of the lens. This cooling suppresses the development of photochromic properties in the selected lens portion and thereby produces a gradient photochromic product.

DESCRIPTION OF THE DRAWING

The invention may be further understood by reference to the drawing illustrating a preferred embodiment of apparatus useful for providing a gradient photochromic ophthalmic lens in accordance therewith.

Figure 1:
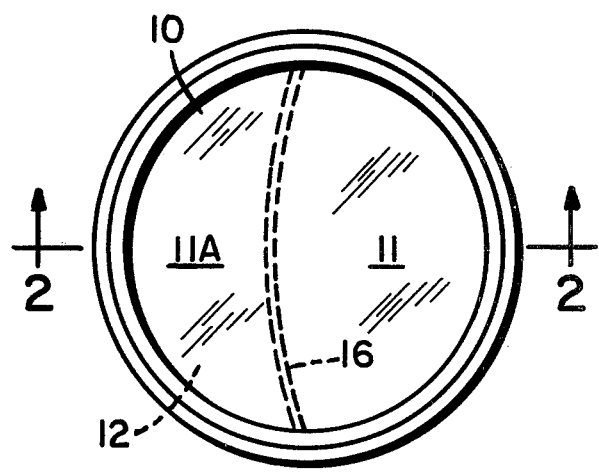
FIG. 1 of the drawing consists of a top plan view of the apparatus, wherein a gradient photochromic ophthalmic lens blank 10 which has been subjected to heat treatment is shown. Region 11 of lens 10 exhibits photochromic properties which are normal to photochromic glasses, whereas region 11A of lens 10 does not. The location beneath region 11A of the porous refractory carrier material 12, which material contained the evaporable liquid and thus suppressed the development of photochromic properties in region 11A, is also shown.
Figure 2:
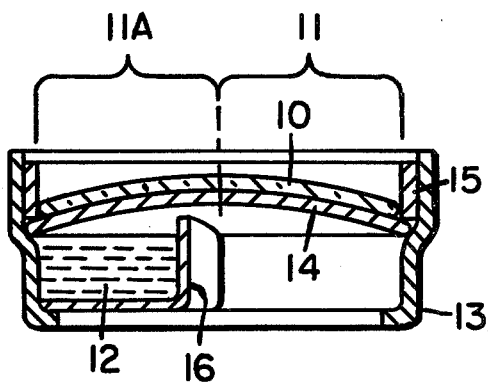

The structural features of the apparatus are more fully shown in FIG. 2 of the drawing, which consists of an elevational view in cross-section of the apparatus along line 2—2 of FIG. 1. The lens support means consists of a cylindrical former cup 13 which provides edge support for a former 14 and a centering ring 15. The cup, former and ring support the ophthalmic lens blank 10.

The carrier support means consists of a cavity 16 within and connected to the cylindrical former cup 13, which cavity supports the porous refractory carrier material 12 containing the evaporable liquid. The carrier and liquid are supported in proximity to the selected limited portions of the former and lens blank 11A which are immediately above the cavity in the drawing.

In operation, the cylindrical former cup supports the former, centering ring and supported ophthalmic lens blank in a horizontal position in the furnace while the entire assembly is heated to a temperature sufficient to develop photochromic properties in the glass. As the cavity and porous refractory carrier material are heated above the boiling point of the evaporable liquid, vapor is generated which acts to cool the portions of the lens blank 11A and former below which the cavity is positioned. This cooling maintains that portion of the lens blank at a reduced temperature suppressing the development of photochromic properties therein. The remaining portion of the lens 11 reaches a temperature approaching the temperature in the furnace, such that the photochromic properties in that portion are fully developed. Thus a gradient photochromic ophthalmic lens is provided.

DETAILED DESCRIPTION

The ophthalmic lens blank to be treated in accordance with the invention may be composed of any of the well known potentially photochromic glasses. By potentially photochromic glass is meant a glass which contains the required photochromic constituents such as halogen, silver, copper, cadmium, or the like, but which has not been subjected to a heat treatment to develop photochromic properties therein. Many glasses which are not photochromic as formed, but which may be rendered photochromic by heat treatment, are known.

Preferred potentially photochromic glasses for the ophthalmic lens blank are glasses which may be heat treated to provide a photochromic phase comprising crystals of a silver halide. However, glasses which will provide a copper-cadmium halide photochromic phase may also be employed.

For the purposes of the present description, a gradient photochromic ophthalmic lens is an ophthalmic lens or lens blank comprising a first lens portion exhibiting normal glass photochromic properties and a second lens portion exhibiting photochromic properties which are at least substantially less developed than the photochromic properties of the first lens portion. Preferably, the second lens portion is non-photochromic. An example of a lens portion exhibiting substantially reduced photochromic properties would be a lens portion which does not darken to the same extent as the remainder of the lens upon exposure to actinic radiation. This behavior can be caused by inhibiting the development of photochromic crystal phases in the glass.

The heat treatment utilized in accordance with the invention may be conventional in all respects except for the use of vapor cooling. Thus, presently used electric or gasfired glass heat-treating furnaces or lehrs may be employed. Also, the usual heat treatment temperatures for the particular glass selected may be used, although modifications may of course be made to the heating schedule to change the nature or extent of the gradient effect. Temperatures in the range of 400°–1000° C. and times of 1/12–24 hours in this temperature range may be used for the treatment of the types of photochromic glasses which might be suitable for ophthalmic lenses.

The function of the porous refractory carrier which is used to support the vapor-generating liquid employed in the invention is to stabilize and control the rate of evaporation of the liquid at the elevated temperatures utilized for heat treating the glass. Any porous refractory material having a fusing temperature at least in excess of the minimum temperature useful for heat treatment, e.g. 400° C., could be employed. Examples of materials which would be suitable are powdered oxides, glasses, or minerals such as alumina, magnesia, clay, gypsum, porous glass, spinel or the like; mineral, glass or other types of fibrous materials such as asbestos, carbon fibers, and refractory glass or glass-ceramic fibers; sintered or bonded cementitous bodies including porous bodies comprising Portland cement or other water-hardenable magnesium or aluminum silicates, either alone or in combination with fibrous or granular fillers to modify the porosity thereof; and even powdered or sintered metals or ceramic-metallic composite materials. The carrier may be in powdered form or it may be bonded or fused into a porous but integral carrier by cementing or sintering. Preferably, the carrier is composed of a ceramic, rather than a metallic, material.

The most important factor to be considered in selecting the porous refractory carrier material is the porosity of the particular carrier selected. It will be found that materials exhibiting excessively large and open pore structures permit excessively rapid evaporation of the evaporable liquid such that, even utilizing reduced heat treating temperatures, depletion of the liquid and overheating of the adjacent lens portions will occur. On the other hand, carrier materials with excessively fine pore structure will be unable to carry a sufficient quantity of evaporable liquid to sustain the vapor generating process throughout the heat treating cycle. Our particularly preferred carrier is an integral porous refractory ceramic material which has been either cemented or sintered into a unitary mass. However, the selection of a porous refractory carrier material possessing the proper pore configuration for use with a particular heat treatment and a particular potentially photochromic glass will be a simple matter of routine experimentation for one of ordinary skill in the art.

The preferred evaporable liquid for use in the invention is water. However, other non-flammable evaporable liquids having a boiling temperature below the minimum temperature normally required for the development of photochromic properties in glass (about 400° C.) and which are non-corrosive with respect to the potentially photochromic glass at some temperature in the range useful for heat treating photochromic glass could also be employed.

The positioning of the refractory ceramic carrier and evaporable liquid with respect to the potentially photochromic glass is not critical provided that the proximity is such that either the glass or its supporting former is directly exposed to the vapors therefrom which are generated during heat treatment. The carrier need not be in contact with the glass. In fact, it may be separated therefrom by the former when the evaporable liquid and porous refractory carrier are positioned beneath and in proximity to the lower surface of the selected limited lens portion wherein the development of photochromic properties is to be suppressed. Although this is the presently preferred position for the carrier, other positions, such as directly above the selected lens portion to be cooled, would also be suitable.

Similarly, the shape of the cavity and its position with respect to the lens are not critical. In fact, the shape of the non-photochromic region in the lens and the position and sharpness of the transition between the photochromic and non-photochromic lens portions may be adjusted by changing the shape of the cavity and/or its position with respect to the lens during treatment.

The invention may be further understood by reference to the following detailed example thereof setting forth the presently preferred procedures for producing a gradient photochromic ophthalmic lens in accordance therewith.

EXAMPLE

A bottomless cylindrical stainless steel step ring former cup approximately 77 mm. in diameter and 35 mm. deep is provided with a semicircular half bottom and a vertical partition joining with the bottom to form a cavity about 16 mm. deep taking up one side of the bottom of the cup. This cavity has a volume of about 37 cm.$^3$.

A porous refractory ceramic carrier material is provided in the cavity as follows. One part by weight of 35–40 mesh alumina (97.8% $Al_2O_3$ by weight, the remainder MgO) is mixed with one part by weight of Johns Manville No. 375 cement and one part by weight of Harbison Walker mineral fiber coating. The Johns Manville No. 375 cement is a Portland cement and mineral fiber mixture which is commercially available from the Johns Manville Corporation, Denver, Colorado 80217. The Harbison Walker mineral fiber coating consists mainly of bentonite clay and mineral fibers, and is commercially available from Harbison Walker Refractories Division, Dresser Industries, Inc., Pittsburgh, Pennsylvania 15222.

The mixture prepared as described is wetted to a mortar-like consistency with water, and is used to fill the cavity in the step ring cup. The cup, cavity and mixture are then heated to 630° C. and maintained at that temperature for 10 minutes to harden the mixture into an integral porous refractory ceramic carrier material.

The step ring cup is then provided with a ceramic former of disk configuration and conventional type which fits into the cup and is edge-supported by a circumferential step in the cup wall. The former is in close proximity to the partition defining the cavity and to the porous refractory carrier material therein. The cup is further provided with a centering ring for positioning an ophthalmic lens blank in the center of the ceramic former.

The assembly prepared as described is then immersed in deionized water for approximately 30 seconds and removed. During this immersion the porous refractory carrier material absorbs about 22 grams of water.

An ophthalmic lens blank about 3.0 millimeters in thickness, composed of a potentially photochromic glass having an approximate composition, in parts by weight, of about 55.4 parts $SiO_2$, 9.0 parts $Al_2O_3$, 6.7 parts BaO, 5.0 parts PbO, 0.210 parts Ag, 0.250 parts Cl, 0.125 parts Br, 0.03 parts NiO, 0.019 parts CoO, 0.017 parts CuO, 0.2 parts F, 1.9 parts $Na_2O$, 16.1 parts $B_2O_3$, 2.1 parts $ZrO_2$ and 2.6 parts $Li_2O$, is disposed on the ceramic former. The entire assembly is then placed in a lehr and subjected to a heat treatment comprising exposure to a temperature of about 650° C. for a time of about 10 minutes.

The ophthalmic lens blank heat treated as described is then removed from the cup and tested for photochromic properties. The portion of the lens which was exposed to the full effect of the heat treatment exhibits normal glass photochromic properties, darkening to a transmittance of about 22% after a 20-minute exposure to a source of ultraviolet light. The portion of the lens which was in proximity to the water-impregnated porous refractory carrier material during heat treatment exhibits little or no photochromism, demonstrating a transmittance of about 70% after the same exposure to ultraviolet light.

Of course it will be recognized that the gradient photochromic effect obtained in each individual case will depend directly upon the composition and type of photochromic glass employed, the particular heat treating schedule utilized to develop photochromic properties in the unprotected portions of the glass, the porous refractory carrier material used, the size, position and configuration of the cavity containing the carrier, and the amount of liquid provided. Thus it will be appreciated that a wide variety of different gradient effects, including sharp or gradual transition regions and unusual gradient types or shapes may readily be obtained within the scope of the invention as hereinabove described.

We claim:

1. A process for heat treating an ophthalmic lens blank composed of a potentially photochromic glass to provide a gradient photochromic ophthalmic lens which comprises the steps of
   (a) exposing the ophthalmic lens blank to a heat treatment at a temperature sufficient to develop photochromic properties in the potentially photochromic glass, while
   (b) maintaining a selected portion of the ophthalmic lens blank in proximity to a quantity of evaporable liquid having a boiling temperature below about 400° C. which is contained in a porous refractory carrier material.

2. A process in accordance with claim 1 wherein the evaporable liquid is water.

3. A process in accordance with claim 2 wherein the porous refractory carrier is composed of a ceramic material.

4. A process in accordance with claim 3 wherein the ophthalmic lens blank is composed of a potentially photochromic glass which may be heat treated to provide crystals of a silver halide as the photochromic phase.

5. In a method of making ophthalmic lenses with gradient photochromic behavior in a heat treatment furnace from a lens blank composed of a potentially phototropic or photochromic glass containing all the necessary ingredients including uniformly dispersed silver halide therein to develop photochromic behavior during heat treatment which comprises the steps of (a) mounting of the lens blanks in a carrier for furnace heat treatment and heating said mounted lens blanks in a heat treatment furnace at a temperature sufficient to develop photochromic behavior in the potentially photochromic glass while (b) maintaining selected portions of the said lens blanks at a temperature to substantially inhibit development of the photochromic behavior by placing a porous refractory with an evaporable liquid therein in proximity of the selected portions to maintain a progressive heat gradation in the lens blanks so that gradient photochromic behavior is produced therein.

* * * * *